United States Patent
Licare

(10) Patent No.: US 9,357,874 B2
(45) Date of Patent: Jun. 7, 2016

(54) HOT AND COLD BEVERAGE MAKER AND METHOD OF USE

(71) Applicant: Andrew Licare, Croton, NY (US)

(72) Inventor: Andrew Licare, Croton, NY (US)

( * ) Notice: Subject to any disclaimer, the term of this patent is extended or adjusted under 35 U.S.C. 154(b) by 0 days.

(21) Appl. No.: 14/852,931

(22) Filed: Sep. 14, 2015

(65) Prior Publication Data

US 2016/0073819 A1    Mar. 17, 2016

Related U.S. Application Data

(60) Provisional application No. 62/049,517, filed on Sep. 12, 2014.

(51) Int. Cl.
 *A47J 31/06* (2006.01)
 *A47J 31/46* (2006.01)
 *A47J 31/44* (2006.01)

(52) U.S. Cl.
 CPC ............ *A47J 31/462* (2013.01); *A47J 31/4403* (2013.01)

(58) Field of Classification Search
 CPC ...... A47J 31/10; B67D 3/0009; B67D 3/0022
 USPC ........... 99/295, 281, 306, 483, 299, 323, 317, 99/322, 319, 284, 275, 283, 287, 348, 290, 99/304
 See application file for complete search history.

(56) References Cited

U.S. PATENT DOCUMENTS

| | | | |
|---|---|---|---|
| 528,463 A | 10/1894 | Busch | |
| 3,241,724 A | 3/1966 | Lemer | |
| 4,091,632 A | 5/1978 | Marchewka et al. | |
| 4,407,356 A | 10/1983 | Delau | |
| 4,508,023 A | 4/1985 | Naya et al. | |
| 4,599,872 A | 7/1986 | Rist | |
| 5,004,046 A | 4/1991 | Jones | |
| 5,031,831 A | 7/1991 | Williams, III | |
| 5,415,002 A | 5/1995 | Koenig | |
| 5,724,883 A * | 3/1998 | Usherovich | A47J 31/057 426/433 |
| 5,947,197 A * | 9/1999 | Lee | A23B 7/10 165/206 |
| 5,947,378 A | 9/1999 | Rebotier | |
| 5,970,847 A | 10/1999 | Saltzman | |
| 6,240,829 B1 | 6/2001 | McGarrah | |
| 6,805,042 B2 | 10/2004 | Mordini et al. | |
| 6,981,441 B1 | 1/2006 | Dussinger | |
| 7,231,142 B1 * | 6/2007 | Leung | A47J 31/057 392/441 |
| 7,305,834 B2 | 12/2007 | Bhatti | |
| 7,757,600 B2 | 7/2010 | Jones et al. | |
| 7,770,410 B2 | 8/2010 | Cote | |
| 7,858,133 B2 | 12/2010 | Neace, Jr. et al. | |
| 7,918,156 B2 | 4/2011 | Greenwald et al. | |
| 8,066,152 B2 | 11/2011 | Tetreault et al. | |
| 8,341,975 B2 | 1/2013 | Knoll et al. | |

(Continued)

FOREIGN PATENT DOCUMENTS

JP    2007054604    3/2007

*Primary Examiner* — Phuong Nguyen
(74) *Attorney, Agent, or Firm* — Gearhart Law, LLC

(57) ABSTRACT

A beverage maker to selectively brew hot or cold beverages employs both a heating unit and a cooling unit. The heating unit heats a liquid, typically water, and uses the heated liquid to hot brew a beverage. Using any of a number of touch sensitive buttons, a coolant can enter a cold brewing unit which subjects the hot brewed beverage to cooling via a helical structure. Further, there may be a resting plate for the container to receive the beverage that can be selectively cooled or heated. The end result is a quick and efficient way to brew either a hot or cold beverage.

17 Claims, 10 Drawing Sheets

(56) References Cited

U.S. PATENT DOCUMENTS

| | | |
|---|---|---|
| 8,429,925 B2 | 4/2013 | Marx |
| 8,490,540 B2 | 7/2013 | Webster et al. |
| 8,539,876 B2 | 9/2013 | Webster et al. |
| 8,555,656 B2 | 10/2013 | Al-Qaffas |
| 8,635,944 B2 | 1/2014 | Buchholz et al. |
| 8,720,321 B2 | 5/2014 | Neace, Jr. et al. |
| 2006/0196365 A1 | 9/2006 | Garman |
| 2007/0051248 A1 | 3/2007 | Lee et al. |

* cited by examiner

HOT AND COLD BEVERAGE MAKER AND METHOD OF USE

CLAIM OF PRIORITY

This application claims priority to U.S. Application 62/049,517 filed on Sep. 12, 2014, the contents of which are herein fully incorporated by reference in its entirety.

FIELD OF THE EMBODIMENTS

The field of this invention and its embodiments relate to beverage making devices, namely beverage making devices capable of brewing a hot or cold beverage. In particular, the beverage making device uses a coolant to selectively cool a brewed beverage or permit a beverage to be brewed and remain hot.

BACKGROUND OF THE EMBODIMENTS

There are a number of ways a person can brew a hot or a cold beverage. Some beverages are preferred by most at one temperature or another, whereas other beverages such as coffee and tea have gained a large following in both their hot and cold varieties.

Typically, to brew a hot beverage, such as coffee, one uses a device that heats up water which is then passed through coffee grounds placed in a filter. The coffee then emanates from the filter is collected in the collection area below the filter. In order to make iced, or chilled, coffee one typically has to use a toddy or resort to pouring hot coffee over ice. Each of these methods have distinct disadvantages when it comes to making iced beverages, especially coffee.

In using a toddy, the brewing process typically takes at least twelve hours during which an extract is collected that can then be diluted. Otherwise, ice must be used with the hot beverage being poured over the ice. This, in turn, creates a more diluted beverage due to the ice (water) present in the serving vessel. Some have attempted to combat this factor of dilution by brewing the coffee used in making iced coffee twice as strong as one regularly would. However, this uses more coffee and ends up costing the patron or business more money.

Thus, there is a need for a beverage maker that can selectively brew a hot or cold beverage in an efficient and expeditious manner. It is also desirable to prevent overuse of coffee grounds or other similar substances due to dilution. The present invention and its embodiment meets and exceeds these objectives. Review of related technology:

U.S. Pat. No. 8,066,152 pertains to a device that has a base that secures to the bottle's neck and has two passages that traverse the base. The first passage leads to an enclosure located above the base that holds cooling material and optionally has a conduit that improves the heat exchange between a dispensing liquid and the cooling material retained in the enclosure. The exit passage of the enclosure has in at least one embodiment a valve. The second passage through the base forms a vent line that is located entirely below the enclosure and allows air to flow into the bottle as bottle's contents are dispensed through the first passage.

U.S. Pat. No. 5,724,883 pertains to a beverage brewing device which includes a conventional brewing assembly, and a cooling assembly for brewing a hot beverage and then dispensing the beverage as a hot beverage or diverting it to the cooling system to dispense it as a cold beverage. A switching assembly is provided to permit the user to selectively choose between a hot beverage and cold beverage. The device also provides a novel cooling cartridge which permits the introduction of hot liquid and results in the dispensing of cold liquid from the cold cartridge.

U.S. Pat. No. 4,599,872 pertains to an insulated container having a low freezing temperature material such as a liquid or semi-liquid, sealed therein. A pouring funnel is provided at the upper end of the container with a spiral conduit extending from the funnel, downwardly through the liquid or material, to a discharge at the base. When frozen, a beverage can be poured into the funnel portion and flows downwardly through the conduit being cooled by the material within the container and surrounding the conduit. The liquid then discharges at the base at a relatively lower temperature. A valve can be provided in the base for controlling the retention time, if desired.

U.S. Patent Application 2007/0051248 pertains to a hot and cold beverage maker for preparing a hot beverage and a beverage jug into which the hot beverage is dispensed and cooled. The jug has an outer receptacle having an outer receptacle wall and a base and an inner receptacle for receiving a cooling agent. The inner receptacle is removably located within the outer receptacle and has an inner receptacle wall together with the outer receptacle wall defining a beverage compartment for receiving the hot beverage to be cooled. A rotational paddle is located within the beverage compartment between the inner and outer receptacle walls for stirring a beverage in the beverage compartment. There may also be a rotational blade within the inner receptacle for agitating the cooling agent.

Various devices are known in the art. However, their structure and means of operation are substantially different from the present disclosure. The other inventions fail to solve all the problems taught by the present disclosure. The present invention uses a thin, hollow double helical structure surrounded by a coolant and located below a typical brewing filter to cool a hot brewed beverage as necessary. At least one embodiment of this invention is presented in the drawings below and will be described in more detail herein.

SUMMARY OF THE EMBODIMENTS

A beverage maker for selectively making hot or chilled beverages is described and taught with the beverage maker having a housing with a base section and a body section, wherein the base section has a plate that can be selectively warmed or cooled; a liquid reservoir contained within the housing; a heating element contained within the housing, wherein the heating element is operably connected to the liquid reservoir; a cooling unit contained within the housing; and a brewing unit contained within the housing, wherein the brewing unit has a cold brewing attachment containing a double helical passageway.

The cooling unit of the beverage maker preferably has at least a motor, a compressor, and a length of conduit. The length of conduit is hollow providing a space for coolant to be contained therein. This, combined with the motor and compressor, enables the coolant to be effectively and near continually cooled as the beverage maker is in use.

By selecting a cold beverage using the touch sensitive buttons, the coolant is cooled and flows into the cold brewing unit. The cold brewing unit has a hollow double helical structure contained therein which traverses the cold brewing unit from the top to the bottom. The beverage is brewed hot but then cooled upon passing through this cold brewing unit. The resting plate can further be cooled to help maintain the temperature of and further cool the beverage. In some instances, the cold brewing unit is removable from the beverage maker.

In another aspect of the invention there is a method of selectively making a hot or cold beverage using a beverage maker, the method comprising the steps of: selecting at least one brewing parameter, wherein the at least one brewing parameter is a temperature of the hot or cold beverage; placing an amount of a liquid into the liquid reservoir; initiating a brewing cycle, wherein a hot brewing cycle uses hot liquid to create a hot brewed beverage, and wherein a cold brewing cycle directs a coolant into a cold brewing unit thereby chilling the hot brewed beverage as it passes therethrough, wherein the cold brewing unit has at least one aperture on a top surface and at least one aperture on a bottom surface, wherein the at least one aperture on the top surface is coupled to the at least one aperture on the bottom surface by a double helical structure capable of permitting a liquid to flow therethrough; and the beverage maker matching a temperature of a resting plate to a temperature of the beverage.

In general, the present invention succeeds in conferring the following, and others not mentioned, benefits and objectives.

It is an object of the present invention to provide a beverage maker that can selectively make a hot or cold beverage.

It is an object of the present invention to provide a beverage maker that uses a coolant to cool or chill a beverage.

It is an object of the present invention to provide a beverage maker that increases the length the beverage travels during the brewing process thereby aiding in cooling the beverage.

It is an object of the present invention to provide a beverage make that uses coolant to selectively cool a resting plate.

It is another object of the present invention to provide a beverage maker that continually cycles the coolant to and from the chilling unit thereby having a near continuous flow of chilled coolant.

DESCRIPTION OF THE PREFERRED EMBODIMENTS

Figure 1:
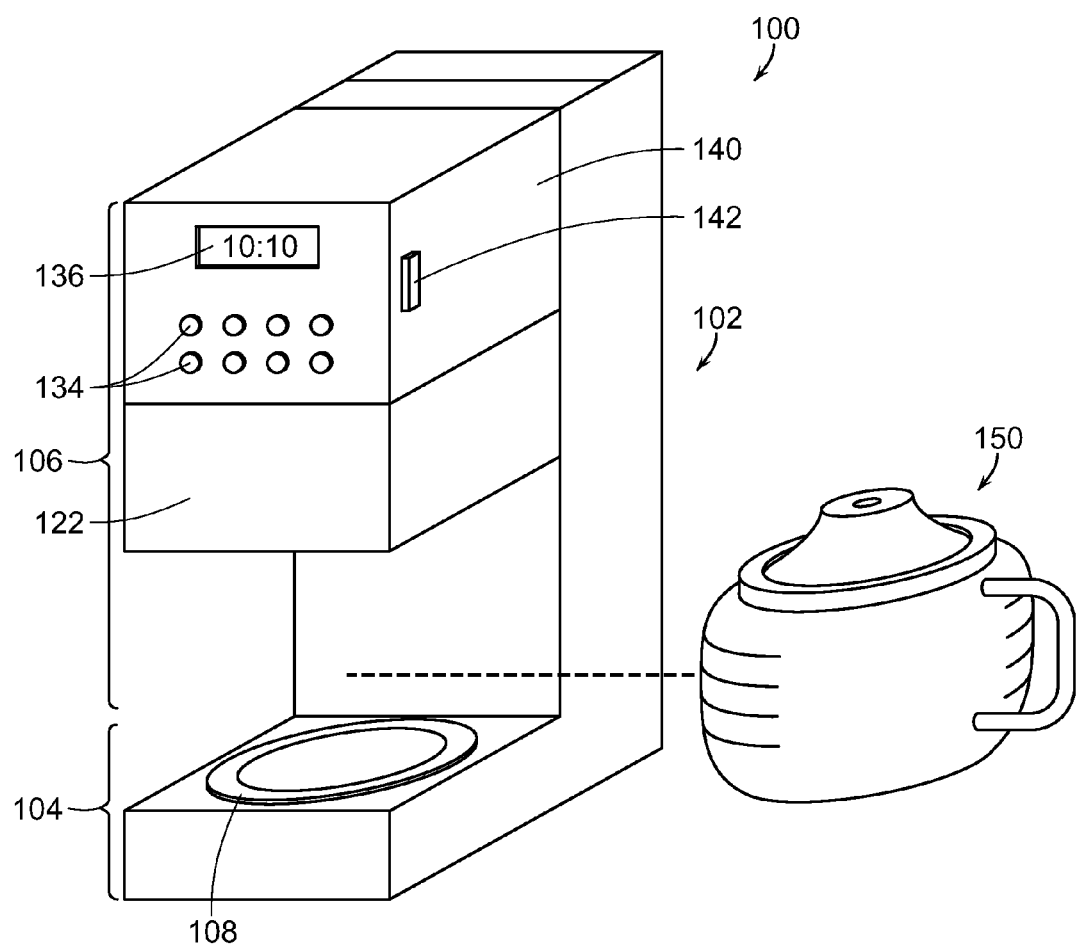
FIG. 1 is a perspective view of an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

It should be noted, that any discussion of a hot or cold beverage should not be seen as exclusive (i.e. only either hot or cold) but can include virtually any temperature ranging from about 4° C. (40° F.) to about 93° C. (200° F.). This permits one to select and fine tune their beverage temperature preference and also provides for more efficient brewing of some beverages. For example, some teas are best brewed at a certain temperature and the beverage maker may facilitate in that process by supplying a precise temperature for the brewing process.

Referring now to FIG. 1, there is a perspective view of a beverage maker 100 in accordance with an embodiment of the present invention. The beverage maker 100 generally has a housing 102 with a base section 104 and a body section 106. The base section 102 has a resting plate 108 that can selectively be warmed or cooled. A beverage vessel or receptacle 150 such as a coffee pot, mug, or the like may be positioned on the resting plate 108 to collect the brewed beverage. The body section 106 primarily houses the remaining internal components of the present invention and provides access to those components.

Figure 2:
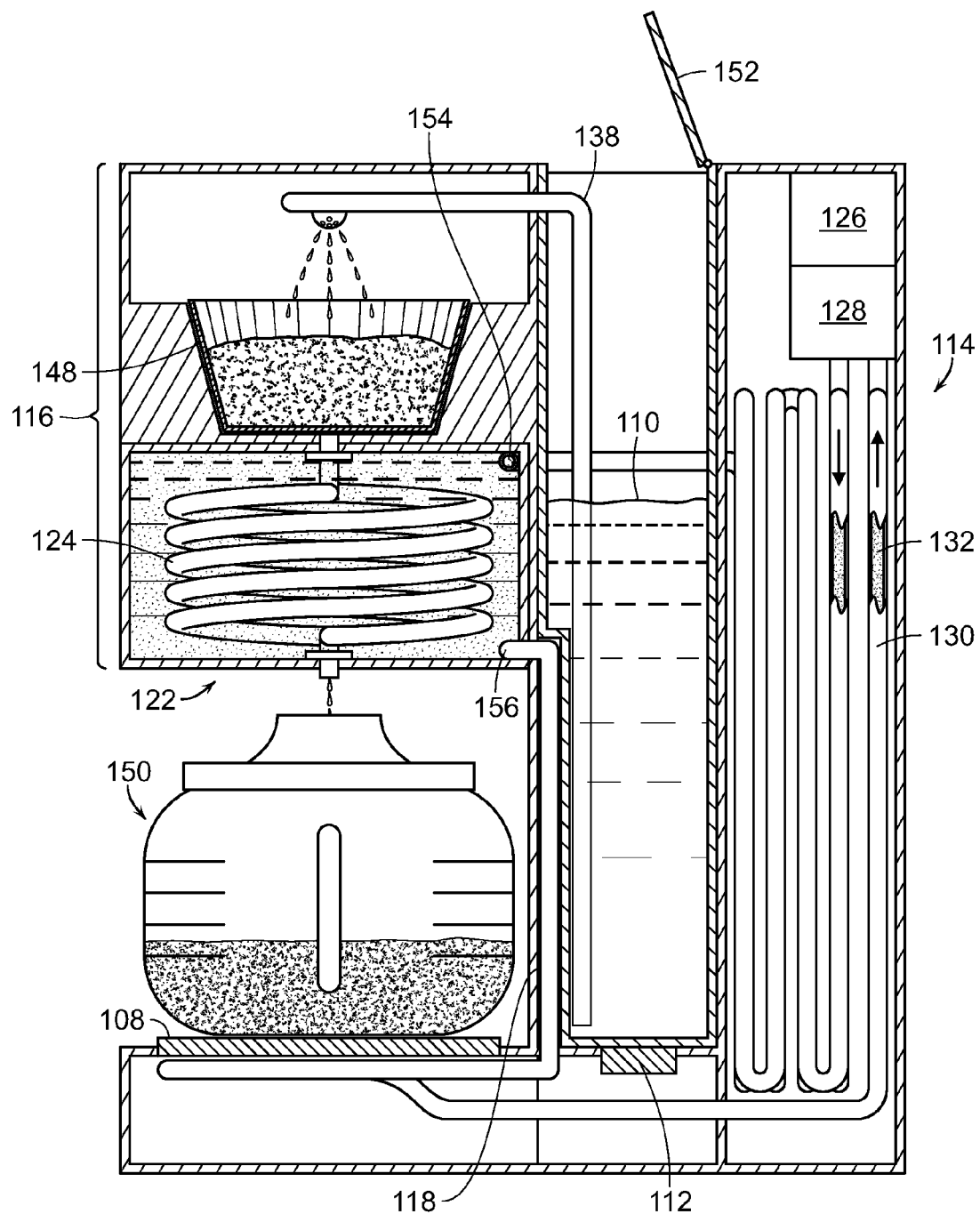
FIG. 2 is a sectional side view of an embodiment of the present invention.

The upper portion of the body section 106 of the housing 102 has a door 140 with a handle 142 that provides access to the brewing unit 116 (see FIG. 2). In some instances, the door 140 may slide or otherwise be manipulated to provide this interior access. On a front face of the housing 102 there is a number of touch sensitive buttons 134 and a display 136. The touch sensitive buttons 134 control the operation and variables attributable to the beverage maker 100. This may include, but is not limited to, a cycle starting time, a temperature of the beverage to be brewed, the type of beverage to be brewed, the size (amount) of beverage to be brewed, and the like or any combination thereof. The touch sensitive buttons 134 may be physical buttons or may be virtual buttons on a touchscreen display.

The display 136 is preferably a liquid crystal display (LCD) that displays a time or other variable(s) associated with the beverage maker 100. Alternatively, like the touch sensitive buttons 134, the display 136 may be a touchscreen display and may be capable of displaying colors, images, animations, and the like or any combination thereof.

FIG. 2 illustrates a sectional side view of the beverage maker 100 showing the interrelationship between all of the internal components. Here, the main areas of the beverage maker 100 are clearly visible: the brewing unit 116, the liquid reservoir 110/liquid transport mechanism 138, and the cooling unit 114.

The cooling unit 114 enables the beverage maker 100 to brew a hot or cold beverage. The cooling unit 114 preferably has a motor 126, compressor 128, and length of conduit 130 contained therein. The length of conduit 130 is filled with a coolant 132 such as an alcohol based substance, tetrafluoroethane, and various hydrofluorocarbons (HFCs) or other suitably low freezing point material (i.e. freezing point below 0° C.). The length of conduit 130 is coiled and shaped to enable a length of conduit 130 longer than the cooling unit 114 to be contained therein. This thereby increases the amount of cooled coolant 132 available for use. The motor 126 and compressor 128 are used to assist in forcing warmed coolant back to its chilled state.

Figure 5A:
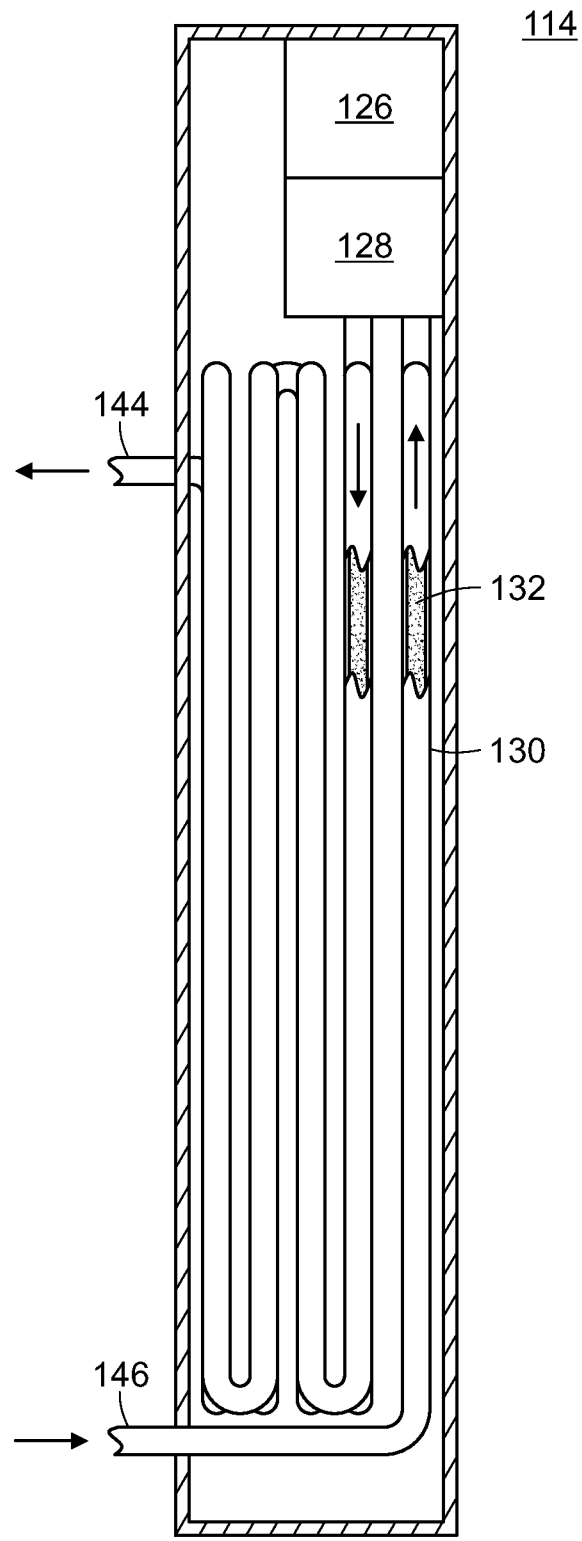
FIG. 5A is a side view of the cooling unit of an embodiment of the present invention.
Figure 5B:
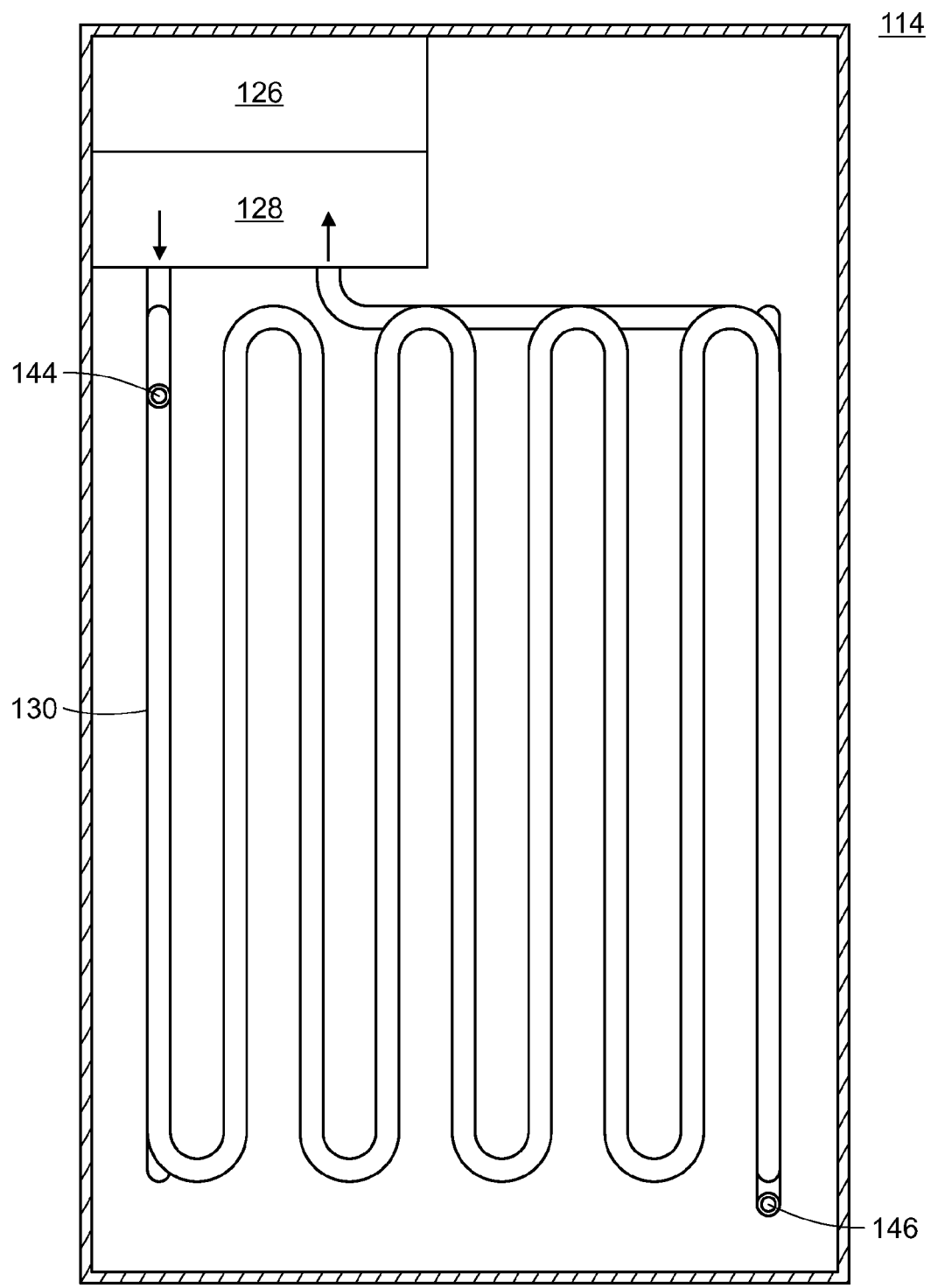
FIG. 5B is a front view of the cooling unit of an embodiment of the present invention.

The length of conduit 130 "enters" and "exits" the cooling unit 114 in at least two points (see FIGS. 5A and 5B). This permits the chilled coolant 132 to leave the cooling unit 114 and the warmed coolant to return to the cooling unit 114 to be chilled yet again.

There is also a liquid reservoir 110 for holding a liquid, preferably water, to be used in a brewing process. The liquid reservoir 110 is preferably covered by a lid 152. The liquid reservoir is operably coupled to a heating element 112. The heating element 112 heats the liquid in the liquid reservoir 110 when a brew cycle is initiated. The heated liquid travels up the liquid transport mechanism 138 and is spread over the tea, coffee, etc. in the filter 148 to be brewed.

The liquid transport mechanism 138 is configured to saturate a substance contained in a filter 148 in the brewing unit 116 with the heated liquid. The brewing unit 116 has a traditional filter brewing arrangement with the filter 148 holding some substance to be brewed into a beverage preferably using heated water.

Below the filter 148, is the cold brewing unit 122. The cold brewing unit 122 has a top surface, bottom surface, and a plurality of side surfaces. In at least one of the surfaces, there is an entrance point 154 and an exit point 156. The entrance point 154 permits the flow of coolant 132 into the cold brewing unit 122 and the exit point 156 allows coolant 132 to leave the cold brewing unit 122. Depending on the position of both the entrance point 154 and exit point 156, flaps, doors, or the like may be necessary to hold the coolant 132 in the cold brewing unit 122 for a length of time. Further such structures could prevent any influx of coolant 132 in the event the cold brewing unit 122 is removable or has been removed. In some instances, having a removable cold brewing unit 122 may allow the beverage maker 100 to function as a typical beverage maker. In other cases, it may allow existing beverage makers 100 to be retrofit with the cold brewing unit 122.

The interior of the cold brewing unit 122 has a double helical structure 124 providing a pathway that traverses the cold brewing unit 122 from the top surface to the bottom surface. The double helical structure 124 is a hollow set of tubing with each tubing forming a helix within the cold brewing unit 122. There is at least one inlet(s) and at least one outlet(s) that enable a substance, preferably a liquid, to enter and exit the length of the double helical structure 124.

The double helical structure 124 is generally formed of thin tubing that may be glass, plastic, metal, rubber, or the like or any combination thereof. Preferably, the material readily permits the transfer of heat (high thermal conductivity) from the beverage to substantially cool the beverage as it passes therethrough. The tubing may have a specific diameter or a varying (narrowing) of a diameter to help restrict the flow of the liquid while exposing as much surface area of the liquid as possible to the interior surface of the tubing.

As coolant 132 is cycled through the cold brewing unit 122, it exits through the exit point 156 and travels down the coolant transport 118. The coolant transport 118 permits the coolant 132 to travel down and under the resting plate 108 thereby providing a cooling of the resting plate 108. This helps to further cool the beverage or prevent the beverage from warming while waiting to be served. The coolant 132 is then brought back to the cooling unit 114 to be rechilled and cycled through the beverage maker 100 as necessary. When the cold brewing unit 122 is not in use, the resting plate 108 can be heated using the heating element 112 or other heating device to perform substantially the same function with a hot beverage.

Figure 3:
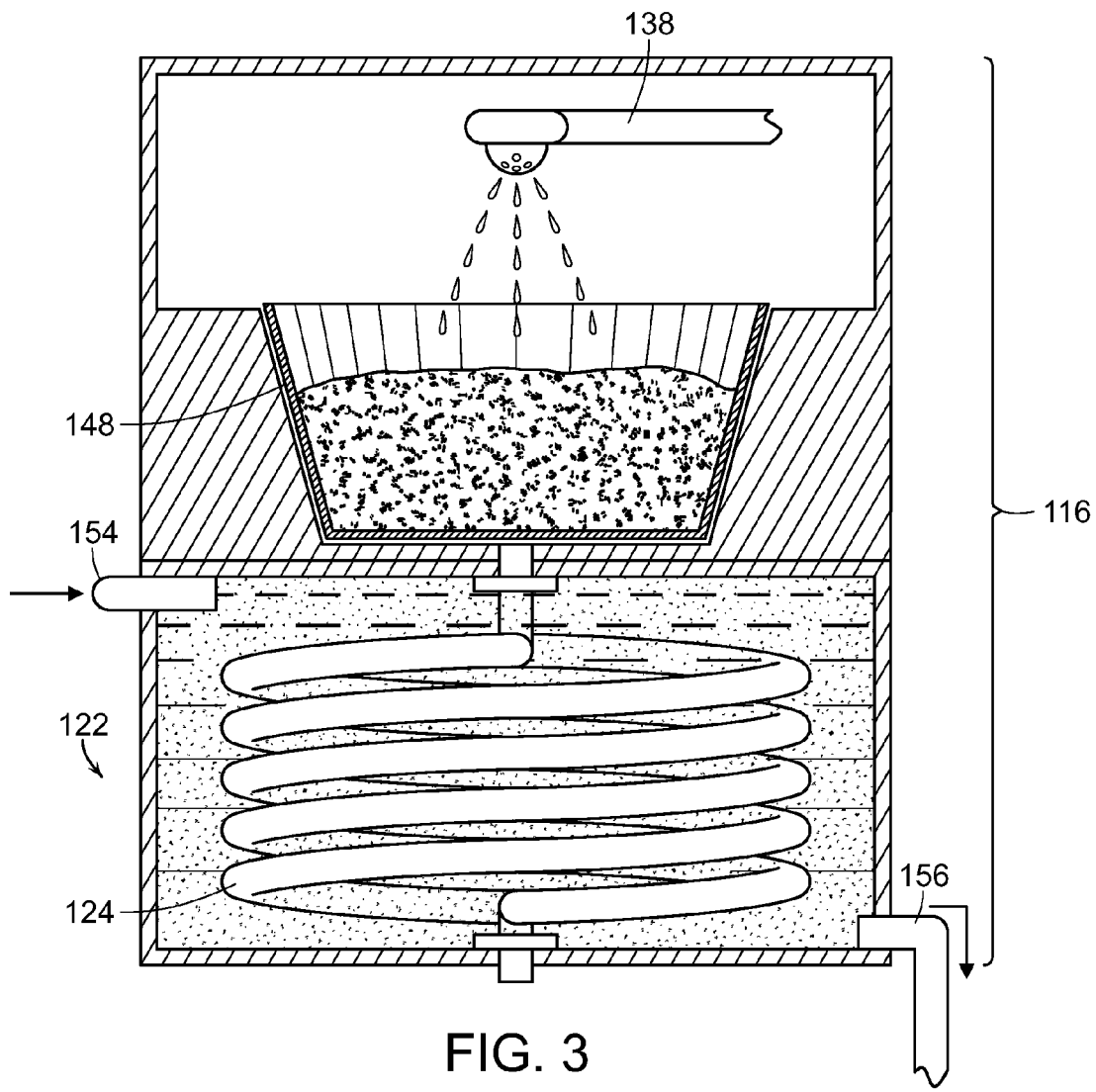
FIG. 3 a front view of the brewing unit of an embodiment of the beverage maker.

Referring now to FIG. 3, there is a front view of a brewing unit 116 having a cold brewing unit 122. The brewing unit 116 functions, initially, as a typical brewing unit. The hot liquid is delivered by the liquid transport mechanism 138. The filter 148 containing the beverage making solids prevents any solids from being imparted into the now hot beverage. The cold brewing unit 122 has an entrance point 154 and an exit point 156. These two points allow coolant 132 in and out of the cold brewing unit 122 as necessary for thermal regulation. The coolant 132 flows around and envelops the double helical structure 124 contained therein.

On a top surface and a bottom surface of the cold brewing unit 122 there is at least one aperture per surface connecting the double helical structure 124 to the exterior of the cold brewing unit. Thus, the brewed beverage can enter the cold brewing unit and the double helical structure 124 through the aperture located in the top surface and exit at the bottom of the cold brewing unit 122 through the aperture in the bottom. As noted, there is at least one aperture and there may be multiple apertures.

The double helical structure 124 maximizes heat transfer of the hot beverage to the coolant 132 thereby cooling the beverage. Depending on the temperature selected for the beverage, this may involve automatically and/or intermittently stopping the flow (blocking the exit) of the hot beverage from leaving the cold brewing unit 122 thereby increasing the retention time of the beverage, changing the temperature of the coolant 132 (See FIG. 2), and controlling the rate of flow of the coolant 132, or any combination thereof. The coolant 132 eventually leaves the cold brewing unit 122 via the exit point 156 and travels down the coolant transport 118 to the resting plate 108 shown in FIG. 4.

Figure 4:
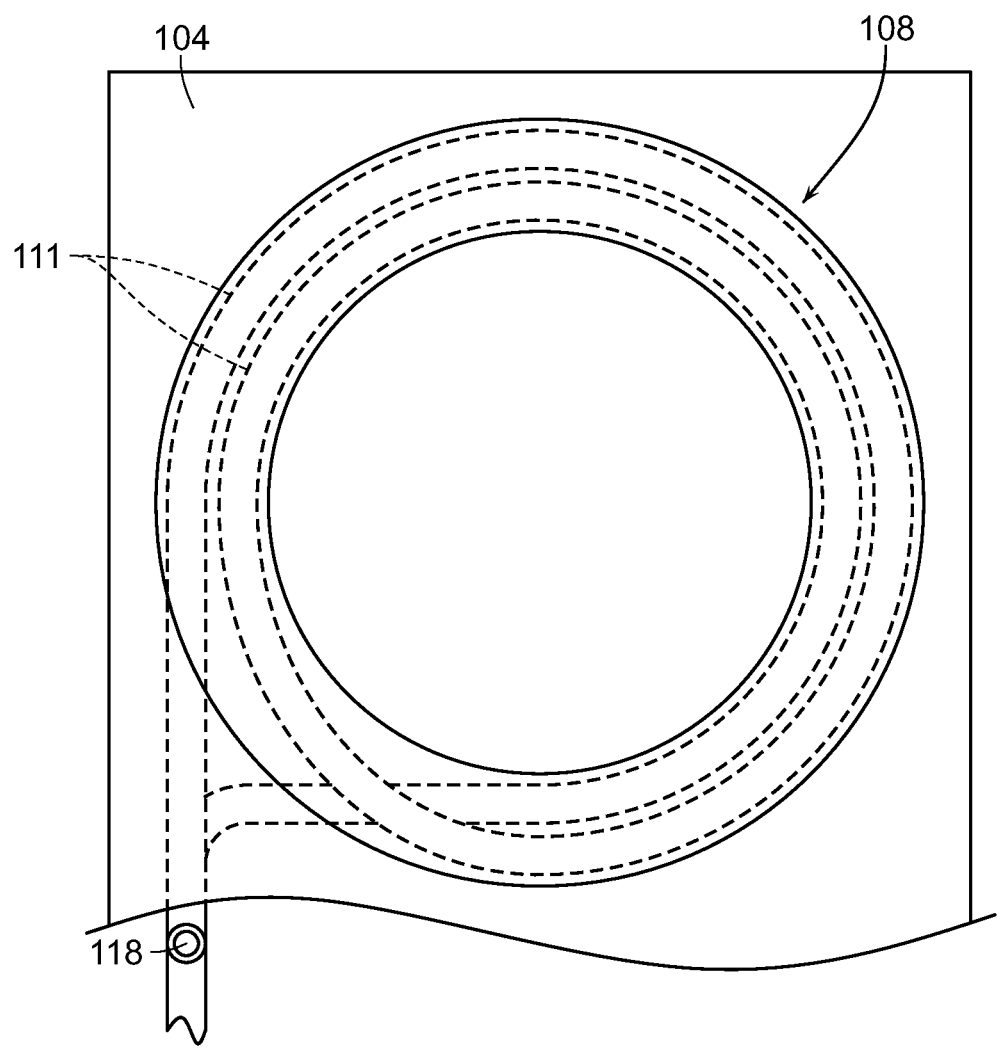
FIG. 4 is a top view of the hot/cold plate of an embodiment of the beverage maker.

As shown in FIG. 4, there is the base 104 of the housing 102 (see FIG. 1). The resting plate 108 is generally centrally located thereon. The resting plate 108 may be operably connected to a heating element, as previously described or a separate heating element, thereby helping to maintain the temperature of a hotly brewed beverage. Additionally, there is an extension of the coolant transport 118 that travels underneath of the resting plate 108. This, alternatively, can help to further chill and prevent a cold beverage from warming. In some instances, there are removable rings 111 which may allow the receptacle (see FIG. 1) to come in direct contact with the coolant transport 118 to achieve maximum temperature retention in the brewed beverage.

In FIGS. 5A and 5B, there is a side view and a front view shown, respectively, of the cooling unit 114. The cooling unit 114 generally has a motor 126, compressor 128, and length of conduit 130 having a coolant 132 contained therein.

In one embodiment, the cooling unit 114 functions similar to a refrigerator. The motor 126 drives the compressor 128 which compresses the coolant 132 in its gaseous form to a liquid state. Heat given off by this process may be dissipated by fans, heat release slits, heat sinks, and the like or any combination thereof. There may be a valve (not shown) located at a point where the conduit 130 exits the cooling unit 114 on its way to the cold brewing unit 122 (see FIG. 3). Once the compressed liquid moves past this valve, it becomes a gas one again thereby cooling the surrounding area via the phase change and then being recycled by the beverage maker.

In another embodiment, there is a low temperature liquid which flows through the conduit 132 and acts as the coolant 132. In this instance, the cooling unit 114 acts as a refrigeration unit for the conduit 130 and thereby the coolant 132 contained therein. The coolant 132 flows throughout the transport system and cold brewing unit 122 thereby chilling the beverage as necessary. There may be an insulative measure required to be added to the cooling unit 114 to retain the temperature of the cooling unit 114 without it disturbing the function of the beverage maker as a whole.

Preferably, the conduit 130 is coiled numerous times in the cooling unit 114 to increase the amount of coolant 132 contained in the system. The coils, or any other configuration, may be arranged in a number of fashions depending on the exact specifications of the cooling unit 114. As shown in FIG.

5A, there is a coolant exit 144 and a coolant return 146 whereby the coolant 132 leaves and returns to the cooling unit 114.

In order use the beverage maker 100 as described in FIGS. 1-5B, one must first ensure there is a proper power supply for the beverage maker 100 which may be any suitable supply including electrical, batteries, solar, and the like or any combination thereof. At least one brewing parameter should be chosen using the touch sensitive buttons 134. The brewing parameter(s) can be any number of variables but should preferably at least include a desired temperature for the beverage to be brewed.

Once the brewing parameters have been determined, a liquid, preferably water, should be placed in the liquid reservoir 110 if this has not already been done or if there is not adequate liquid for brewing. The brew cycle can then be initiated. If the beverage to be brewed is a hot beverage, or a beverage which requires no cooling, then the cooling unit and cold brewing unit 122 are not used. However, if such a beverage will require some degree of cooling both are used and may require a preparatory stage before the beverage can begin to be brewed.

The beverage is then brewed according to the proper protocols. Once the beverage has been brewed, the resting plate is maintained at the proper temperature by the use of the coolant or a heating element.

Figure 6A:
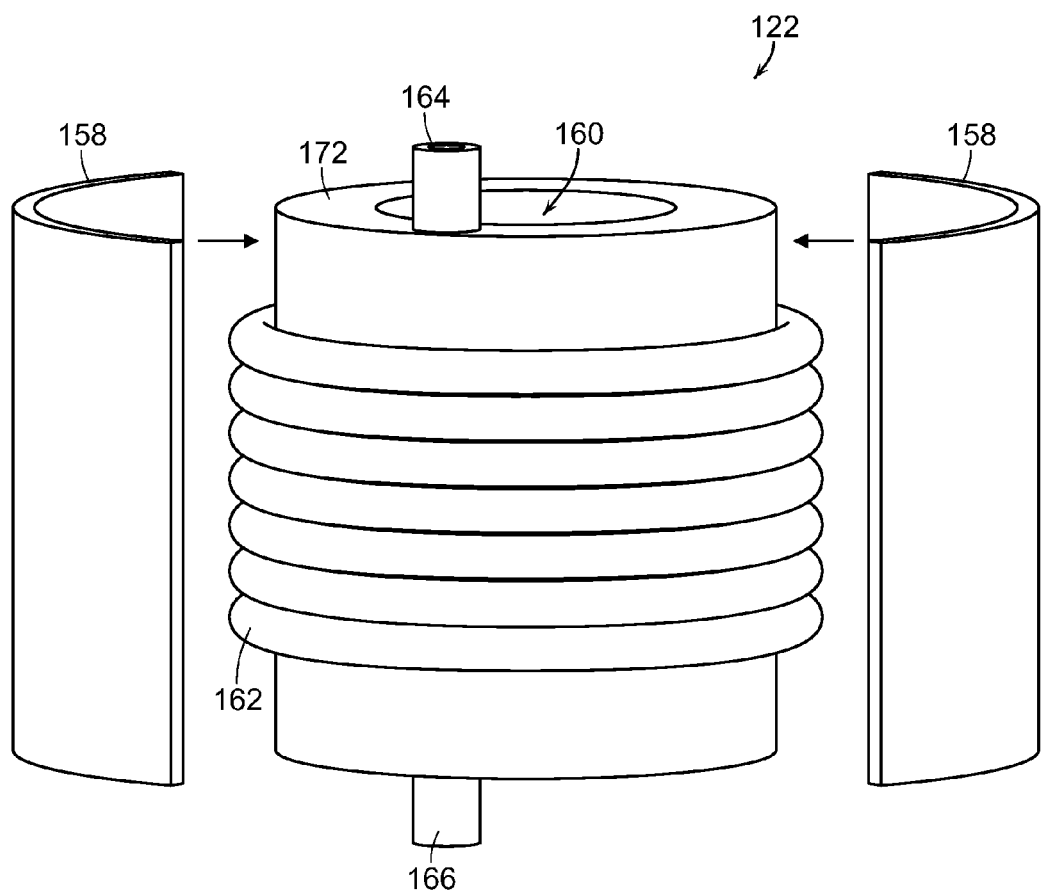
FIG. 6A is an exploded side view of an alternate cold brewing unit.
Figure 6B:
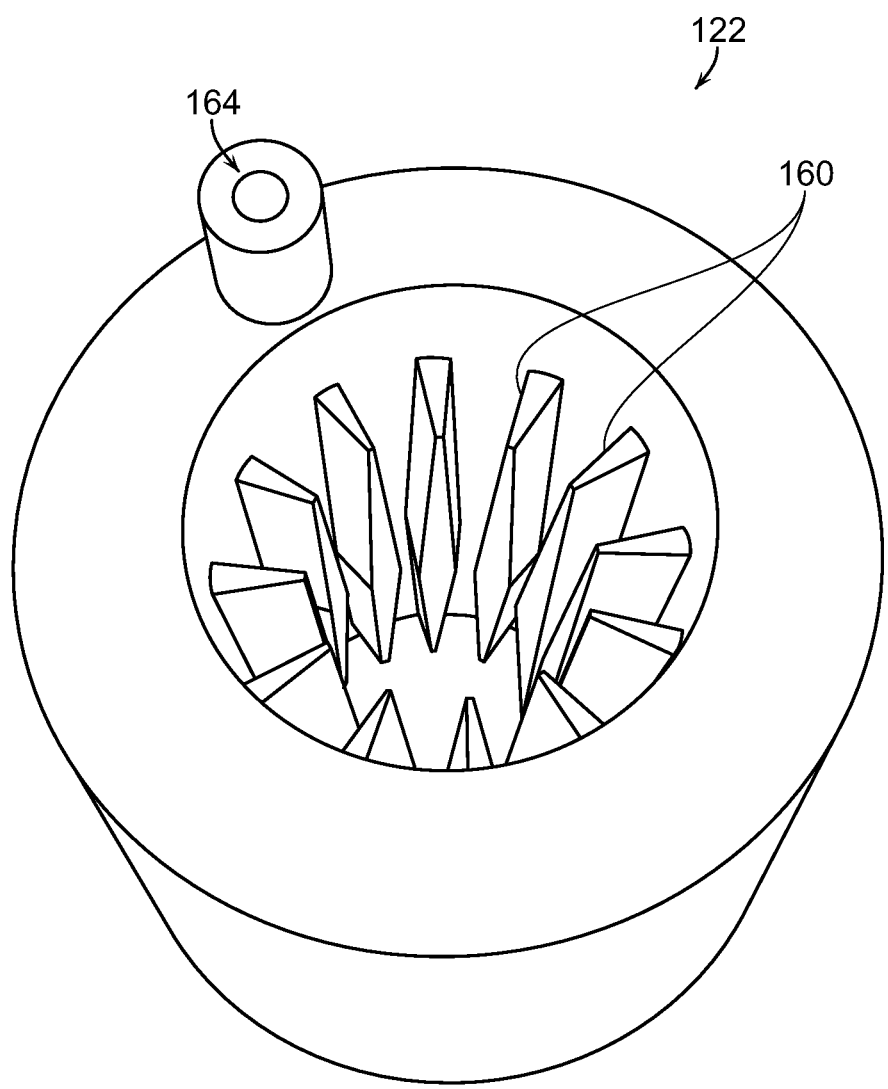
FIG. 6B is a top view of an alternate cold brewing unit.
Figure 6C:
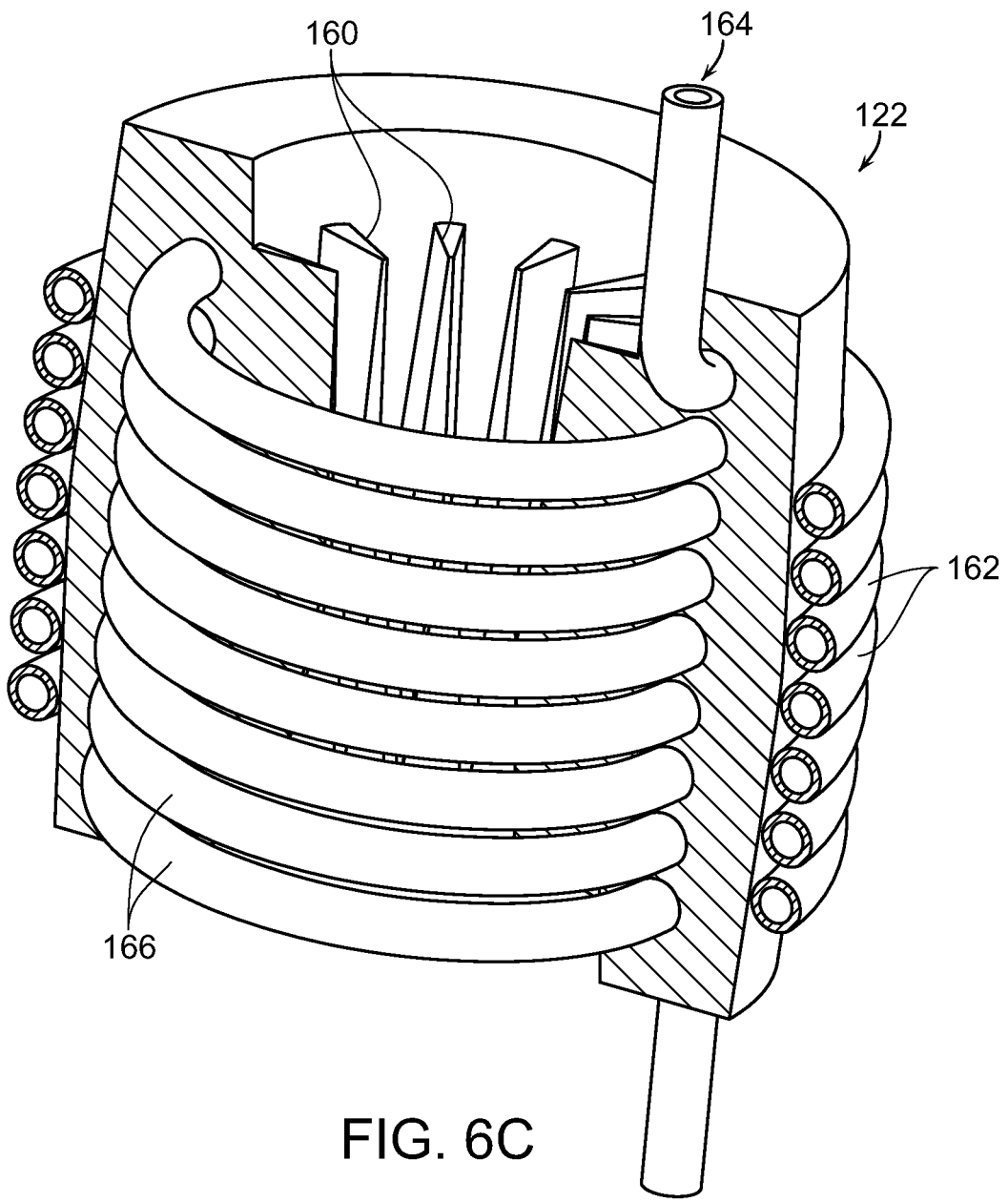
FIG. 6C is a sectional side view of illustrating some of the components of an alternate cold brewing unit.

Referring now to FIGS. 6A-C, there is an alternate cold brewing unit capable of being used in accordance with the present invention. The cold brewing unit 122 may generally comprise a core 172, heat sink 160, entrance 164, exit 158, insulative material 158, tubing 162, and a pathway 166.

The core 172 may be comprised of a metal or composite or other material selected for its thermal conductive properties. In some embodiments, the core 172 may be comprised of aluminum. The core 172 may be round or another shape to accommodate the pathway 166 or beverage maker specifications. The core 172 preferably has an aperture extending there through containing a plurality of heat sinks 160. The heat sink(s) 160 may be comprised from the same or a different material(s) than the remaining mass of the core 172. The heat sinks 160 are generally blade shaped protrusions emanating from an inner wall of the core 172. Alternatively, the heat sinks 160 may bear other shapes or may be located in varying locations around the core 172. As conventionally understood, the heat sinks 160 serve to dissipate heat from the core 172 when the apparatus is in use thereby resulting in greater efficacy of the cold brewing unit 122.

The core 172 has a pathway 166 embedded therein as shown in FIG. 6C. The pathway 166 has at least an entrance 164 and an exit 158 via which the brewed beverage will travel during the cooling process. In some instances, multiple entrances and exits may be used for multiple pathways to increase the rate of flow and decrease the overall brewing time. The entrance 164 and exit 158 may both protrude from the core 172 whereas the remaining sections of the pathway 166 are embedded as shown in FIG. 6A. The pathway 166 may be helical in nature or may comprise a double helix or other type of pathway including but not limited to irregularly or patterned pathways that utilize the core 172 for cooling the beverage as it passes therethrough.

The core 172 may be surrounded by a conduit of tubing 162 that contains a coolant such as Freon but may also be gases such as hydrogen, liquids such as oils, glycols, refrigerants, and the like. In other embodiments, the tubing 162 may be embedded in the core 172 similar to that of the pathway 166. In the particular embodiment shown, the tubing 162 could be interspersed in the coils of the pathway 166 with its own entrance and exit point. In other embodiments, the tubing 162 could be contained within the mass of the core 172 but on the inside, outside, or inside/outside of the pathway 166.

Further, an insulative material 158 may be utilized to help keep the cold brewing unit 122 cold during the brewing process and protect it from any external heat source. The insulative material 158 may be those materials known in the art such as Styrofoam, fiberglass, cellulose, and the like. The insulative material 158 may cover at least part of the core 172 and in some embodiments will sufficiently cover the entire core 172.

Figure 7:
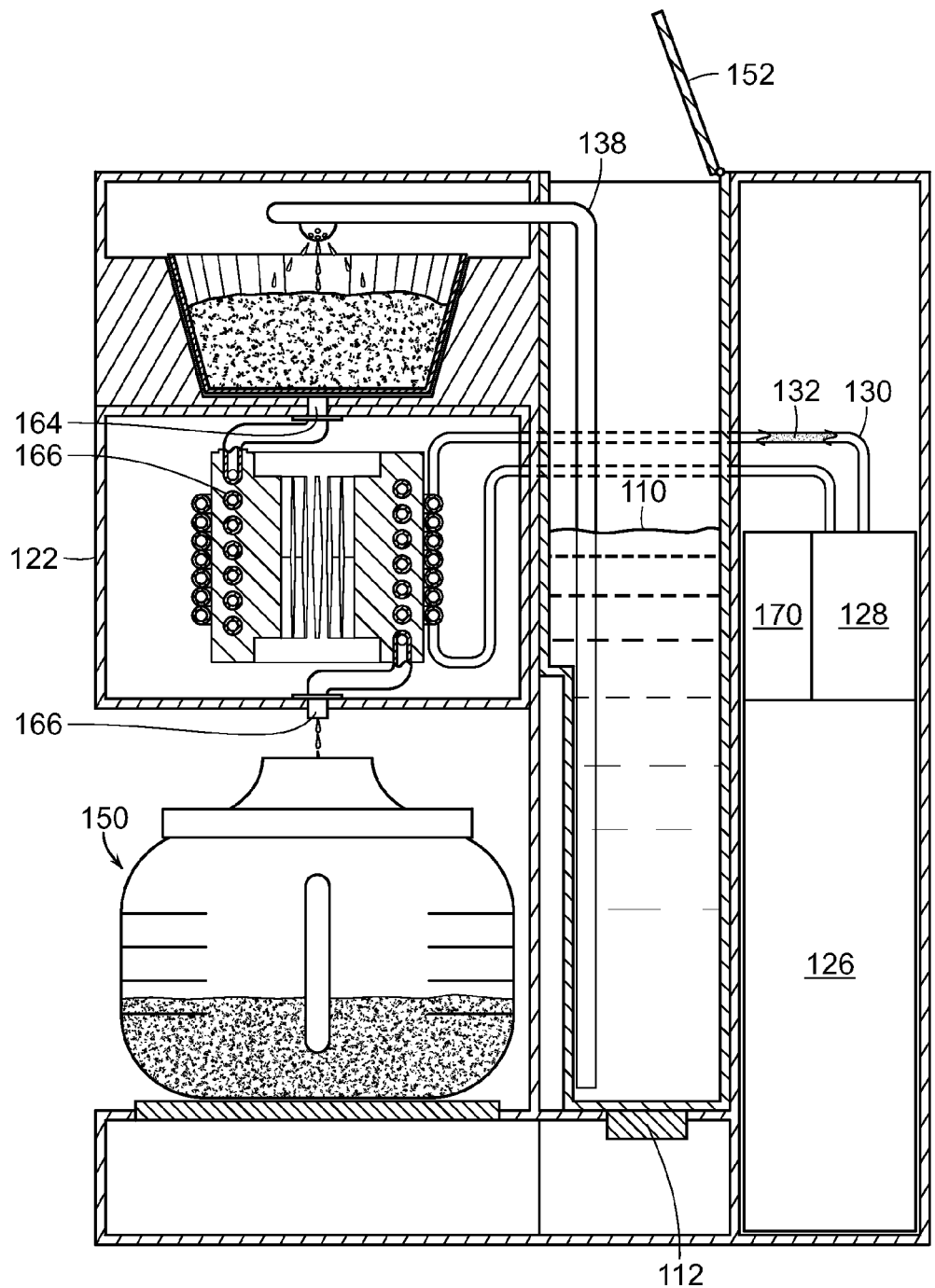
FIG. 7 is a sectional side view of another embodiment of the present invention

FIG. 7 illustrates another embodiment of the present invention useful for brewing both hot and cold beverages such as coffees, teas, and the like. Generally, there is a cold brewing unit 122, entrance 164, exit 166, receptacle 150, liquid transport mechanism 138, liquid reservoir 110, lid 152, conduit 130, coolant 132, heating unit 112, motor 126, compressor 128, and thermostat 170. Varying configurations of these components and others may also exist incorporating the cold brewing unit technology and other technologies not explicitly described herein.

The cold brewing unit 122 may be removable or may be a permanent component of the beverage maker. In practice, a user may add a liquid such as water to the liquid reservoir 110 of the beverage maker. The liquid heats up via the heating element 112 and is dispersed over the beverage making material (tea leaves, coffee grounds, etc.) to be brewed. The user can select to turn on or off the cold brewing unit 122 which functions to turn on/off the motor 126, compressor 128, and thermostat 170. This can be done before or after the brewing process has started.

Once activated, the motor 126 and compressor 128 serve to chill the coolant 132 contained within the conduit 130, and the thermostat ensures the proper temperatures are met and maintained throughout the brewing process or whenever the cold brewing unit 122 is activated by a user. The conduit 130 feeds into the tubing 162 thereby providing cool temperatures to the core 172. The temperature of the coolant causes the core 172 to reach substantially the same temperature within its insulative coating 158 (see FIG. 6A). The brewed beverage enters the entrance 164 and travels down the pathway 166 through the core 172. The beverage then leaves the core 172 and cold brewing unit 122 as a whole via the exit 168. The beverage is now considerably colder than when initially brewed, making for a non-diluted and satisfyingly cold brewed beverage. In trial studies run using this technology, the cooled beverage ranged from about 60 degrees to about 70 degrees Fahrenheit, whereas the hot brewed beverage was about 170 degrees Fahrenheit.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A beverage maker for selectively making hot or chilled beverages, the beverage maker comprising:
    a housing having a base section and a body section,
    a liquid reservoir contained within the housing;
    a heating element contained within the housing,
        wherein the heating element is operably coupled to the liquid reservoir; and
    a cooling unit operably coupled to a brewing unit contained within the housing, the cooling unit comprising at least a motor, a compressor, and a length of conduit,
        wherein the brewing unit has a cold brewing unit containing at least one beverage pathway therethrough, wherein at least one aperture is located in a top of the cold brewing unit and at least one aperture is located in a bottom of the cold brewing unit with the top aperture and the bottom aperture being coupled by the at least one beverage pathway, wherein the at least one beverage pathway is at least one helical pathway.

2. The beverage maker of claim 1 further comprising an insulative material at least partially surrounding the cold brewing unit.

3. The beverage maker of claim 1 further comprising a resting plate in the base section of the housing with the resting plate being capable of being selectively warmed or cooled.

4. The beverage maker of claim 1 wherein the cold brewing unit is removable.

5. The beverage maker of claim 1 further comprising a plurality of touch sensitive buttons.

6. The beverage maker of claim 5 wherein at least one of the plurality of touch sensitive buttons controls the temperature of a brewed beverage.

7. A beverage maker for selectively making hot or chilled beverages, the beverage maker comprising:
 a housing having a base section and a body section with the base section;
 a cooling unit,
  wherein the cooling unit has a motor, a compressor, and a length of conduit coupled thereto, the length of conduit having a coolant contained therein;
 a liquid reservoir sized to hold an amount of a liquid;
 a heating element coupled to the liquid reservoir;
 a brewing unit operably connected to the cooling unit,
  wherein the brewing unit has a cold brewing unit, the cold brewing unit having a top, bottom, and at least one sidewall therebetween,
   wherein the cold brewing unit is encapsulated in an insulative material,
   wherein at least one aperture is located in the top of the cold brewing unit and at least one aperture is located in the bottom of the cold brewing unit,
   wherein the top and bottom aperture are coupled by at least one helical pathway contained within the cold brewing unit; and
  wherein the cold brewing unit and the heating element are capable of being selectively operated thereby causing a warm or cooler beverage to be brewed by the beverage maker.

8. The beverage maker of claim 7 further comprising a power source.

9. The beverage maker of claim 7 further comprising a resting plate, wherein the resting plate is capable of being selectively warmed or cooled.

10. The beverage maker of claim 9 further comprising a removable ring disposed on the resting plate whereby removal of the removable ring allows for direct contact between the coolant transport and a beverage receptacle.

11. The beverage maker of claim 7 wherein the length of conduit is wrapped around the cold brewing unit and covered by the insulative material.

12. The beverage maker of claim 7 wherein the length of conduit is embedded in the cold brewing unit.

13. The beverage maker of claim 7 wherein the cold brewing unit is cylindrical in shape with an aperture passing therethrough.

14. The beverage maker of claim 13 further comprising heat sinks emanating from a surface of the aperture.

15. The beverage maker of claim 7 wherein the at least one helical pathway is a double helical pathway.

16. The beverage maker of claim 7 wherein the bottom aperture of the cold brewing unit is capable of being selectively sealed thereby causing any beverage within the at least one helical pathway to be retained for an amount of time.

17. The beverage maker of claim 7 wherein a core of the cold brewing unit is a thermally conductive material.

\* \* \* \* \*